United States Patent [19]

Corkery

[11] 4,176,816

[45] Dec. 4, 1979

[54] PROCESS FOR IMPROVING IMPACT RESISTANCE OF RIGID NYLON ARTICLES AND THE ARTICLES PRODUCED THEREFROM

[75] Inventor: Gregory O. Corkery, Valley Park, Mo.

[73] Assignee: Arundale, Inc., St. Louis, Mo.

[21] Appl. No.: 833,168

[22] Filed: Sep. 14, 1977

[51] Int. Cl.² .................... F16M 11/20; B29C 25/00
[52] U.S. Cl. ............................... 248/188.9; 156/145; 215/1 C; 264/232; 264/343; 428/474
[58] Field of Search ............ 156/145; 248/188.4, 248/188.9; 264/4, 232, 340, 343; 312/31.03, 31.1; 428/474, 35; 62/457

[56] References Cited

U.S. PATENT DOCUMENTS

| | | | |
|---|---|---|---|
| 2,991,500 | 7/1961 | Hagen | 156/145 |
| 3,041,777 | 7/1962 | Schwartz | 248/188.4 |
| 3,059,452 | 10/1962 | Griffin | 62/457 |
| 3,406,532 | 10/1968 | Rownd et al. | 62/457 |
| 3,955,040 | 5/1976 | Schirmer | 428/474 |
| 3,970,273 | 7/1976 | Tanner | 248/188.9 X |

FOREIGN PATENT DOCUMENTS 1424231  11/1965  France ................... 248/188.9

OTHER PUBLICATIONS

R. M. Ogorkiewicz, *Engineering Properties of Thermoplastics*, Nov. 23, 1970, p. 180.

*Primary Examiner*—Lawrence J. Staab
*Attorney, Agent, or Firm*—Richard J. Sher

[57] ABSTRACT

Rigid nylon articles are provided with a chamber therewithin and water is sealed within the chamber. The water is in continuous contact with the nylon and is absorbed by the nylon over a long period of time to increase and maintain the maximum impact resistance of the nylon article.

8 Claims, 4 Drawing Figures

PROCESS FOR IMPROVING IMPACT RESISTANCE OF RIGID NYLON ARTICLES AND THE ARTICLES PRODUCED THEREFROM

BACKGROUND AND SUMMARY OF THE INVENTION

A multitude of rigid articles molded of nylon are utilized by industry. It is well known that the impact strength of nylon articles is markedly increased when treated with water to increase the moisture content thereof. (See for example *Engineering Properties of Thermoplastics*, by R. M. Ogorkiewicz, Wiley-Interscience, New York, 1970). The moisture content of nylon parts has, in the past, been increased by (1) boiling the parts in water, (2) conditioning the parts at a required humidity, and (3) immersing the parts in cold water. Nylon appliance support feet, for example, have been conditioned for increased impact strength by soaking a large quantity of the parts in vats of cold water for a full twenty-four hour period. This process is time consuming and requires a great deal of space for the vats, and is thus costly. Further, as soon as the parts leave the water bath, the moisture content of the nylon begins to decrease and thus the impact strength thereof begins and continues to diminish.

According to the principles of the present invention, rigid nylon articles are provided with an internal chamber into which is sealed a quantity of water. The water, being in intimate contact with the nylon, continues to be absorbed by the nylon from within to replenish the moisture lost from the article to the surrounding atmosphere. In this manner the moisture content of the nylon is maintained at a maximum level until the water supply within the nylon article is exhausted. Inasmuch as the moisture is lost from the nylon relatively slowly in most applications, the water supply will last for years, thus nylon parts produced according to the principles of the invention will maintain the maximum impact resistance thereof years longer than parts treated by conventional methods.

It is therefore an object of the invention to improve the impact resistance of rigid nylon articles by the process of providing the article with an internal water-encapsulating chamber so that water will continually be in intimate contact with the nylon to replenish the moisture content of the nylon as moisture is lost therefrom to the atmosphere.

It is a further object to produce rigid nylon articles, according to the process of the invention, which exhibit maximum impact resistance for a longer period of time as compared with nylon articles treated according to conventional methods.

It is a still further object of the invention to provide a process for water conditioning rigid nylon parts which is simple, inexpensive, and does not require a long production time to accomplish.

BRIEF DESCRIPTION OF THE DRAWINGS

While the present invention may be applied to a multitude of different rigid nylon articles, one preferred embodiment of the invention is illustrated and described hereinbelow in order that the above objects and advantages as well as others will become more apparent upon a reading of the following in conjunction with the drawings wherein.

DETAILED DESCRIPTION OF A PREFERRED EMBODIMENT

Figure 3:
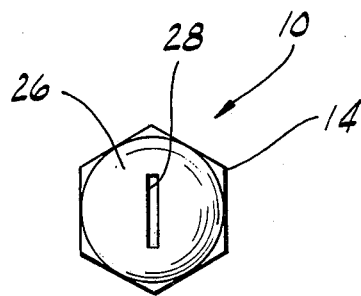
FIG. 3 is a bottom view of the foot of FIG. 1.
Figure 4:
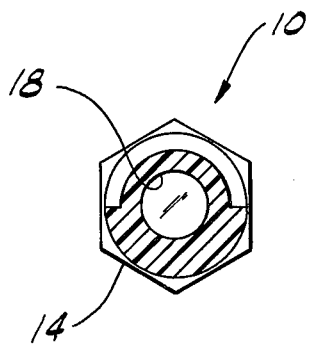
FIG. 4 is a horizontal cross-section of the foot taken along line 4—4 of FIG. 1.

With reference to the drawings, FIGS. 1-4 depict a rigid appliance foot generally referred to by the numeral 10. Foot 10 includes a generally cylindrical body portion 12 and an integral head or bearing portion 14, both portions being unitarily molded of rigid nylon. The exterior surface of body portion 12 is provided with a continuous integral helical thread 16, and a cylindrical blind bore or chamber 18 is formed within body portion 12 having an open upper end 20 and being closed at the lower end thereof 22 by an interior surface 24 of bearing portion 14. As best seen in FIG. 3, bearing portion 14 is provided with a hexagonal periphery and the bottom surface 26 includes an elongated slot 28.

Bore 18 is filled or at least partially filled with water 29 and a plastic cap 30 is sealed as by sonic welding or hot plate welding to the peripheral top 32 of body portion 12, thereby effectively sealing the water 29 within bore 18.

Figure 1:
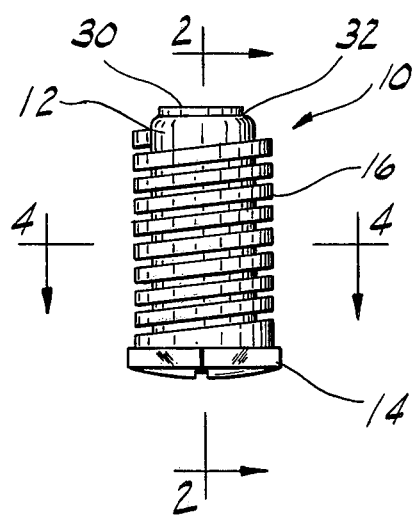
FIG. 1 is an elevational view of a rigid nylon appliance foot strengthened according to the process of the invention.
Figure 2:
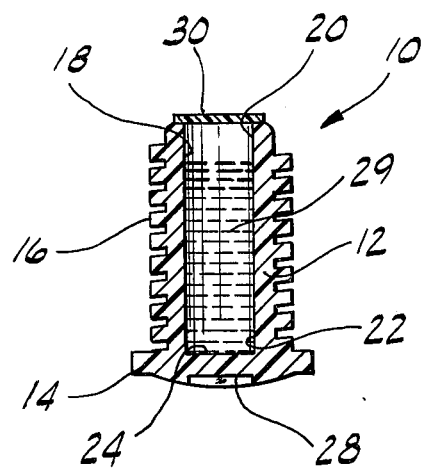
FIG. 2 is a vertical cross-section of the foot taken along line 2—2 of FIG. 1.

In use, body portion 12 of appliance foot 10 may be turned by means of hexagonal head portion 14 or slot 28 and screwed into a hole in a sheet metal base of an appliance such as a domestic clothes washer or dryer (not shown, but as is generally depicted in FIG. 1. of U.S. Pat. No. 3,970,273) to thereby support a corner of the appliance upon bearing portion 14 at a desired level.

Inasmuch as rigid nylon foot 10 includes water 29 sealed therewithin, the inner wall of bore 18 and interior surface 24 of bearing portion 14 will for a relatively long period of time be exposed to the water and will continually absorb water which is dispersed throughout the entire nylon structure to increase the moisture content of the nylon, and thus increase the impact resistance of foot 10 for many years longer than if water were not continually in communication with the nylon part. A nylon appliance foot manufactured according to the principles of the invention will be able to withstand, without failure of the part, greater impact forces for a longer period of time.

Further, a rigid nylon part manufactured according to the invention may be saturated with moisture from within to maintain the maximum impact resistance thereof for many years without the necessity of performing a pre-soaking or other time consuming and expensive moisture treating process. The impact resistance will increase while the parts are being shipped and will be at a maximum level before the initial use of the part.

If desired, the nylon parts may also be pre-soaked or otherwise treated to saturate the nylon with moisture. Thereafter, the part will remain at a maximum moisture level until all of the water within the internal chamber has been lost through the part. In this case, however, the part will be maintained at maximum impact strength for years, while in contrast, a pre-soaked part of the prior art will immediately begin to diminish in impact resistance from the moment it leaves the water vat.

In either case, the time period of maximum impact resistance will be affected by the thickness of the nylon part, the quantity of water introduced into the chamber and the temperature and humidity of the environment into which the part is placed.

Inasmuch as the present invention may be practiced with any rigid nylon parts capable of being provided with a sealed internal chamber containing water, it is requested that the above-described preferred embodiment be considered only as examplary of the invention, and that the scope of the invention be determined by the following claims.

I claim:

1. A process for improving the impact resistance of an article formed of molded, rigid nylon comprising the steps of:
   forming the molded, rigid nylon article with a chamber therewithin;
   introducing a sufficient quantity of water into said chamber and into intimate contact with said nylon article so that said water may be absorbed by said nylon over a long period of time; and
   sealing the chamber in order to encapsulate the water within said chamber.

2. The process of claim 1 and comprising the additional step of:
   pre-soaking said article in water to bring the moisture content of the nylon to a saturation level prior to said sealing.

3. A process for improving the impact resistance of a molded, rigid nylon support foot for an appliance comprising the steps of:
   forming said rigid nylon foot with a chamber therewithin;
   introducing a sufficient quantity of water into said chamber and into intimate contact with said nylon article so that said water may be absorbed by said nylon over a long period of time; and
   sealing the chamber in order to encapsulate the water within said chamber.

4. The process of claim 3 and comprising the additional step of:
   pre-soaking said foot in water to bring the moisture content of the nylon to a saturation level prior to said sealing.

5. An article of manufacture comprising:
   a member formed of molded, rigid nylon adapted to provide impact resistance;
   said member defining a chamber therewithin;
   water in said chamber and in intimate contact with said rigid nylon;
   said water being in said chamber in sufficient quantity so that said water may be absorbed by said nylon over a long period of time; and
   sealing means associated with said member for sealing said water within said chamber.

6. A support foot for supporting appliance comprising:
   a generally cylindrical body portion and a unitary head portion formed of molded, rigid nylon;
   an integral helical thread portion formed on the exterior of said body portion;
   an elongated chamber formed within said body portion;
   water in said chamber in intimate contact with said nylon;
   said water being in said chamber in sufficient quantity so that said water may be absorbed by said nylon over a long period of time; and
   sealing means for sealing said water within said chamber.

7. A support foot as specified in claim 6 and further characterized by:
   said sealing means comprising a plastic cap member heat sealed to said body portion.

8. A support foot as specified in claim 6 and further characterized by:
   said sealing means comprising a plastic cap sonically welded to said body portion.

* * * * *